United States Patent
Li et al.

(10) Patent No.: US 7,768,974 B2
(45) Date of Patent: Aug. 3, 2010

(54) METHOD AND ARRANGEMENT FOR GENERATING PILOT BEACONS IN WIRELESS COMMUNICATION SYSTEMS

(75) Inventors: Patrick Li, Mendham, NJ (US); Gregg Nardozza, Glenwood, NJ (US); Victor Pan, Bedminster, NJ (US)

(73) Assignee: Alcatel-Lucent, Murray Hill, NJ (US)

( * ) Notice: Subject to any disclaimer, the term of this patent is extended or adjusted under 35 U.S.C. 154(b) by 2283 days.

(21) Appl. No.: 10/356,622

(22) Filed: Feb. 3, 2003

(65) Prior Publication Data

US 2004/0151139 A1    Aug. 5, 2004

(51) Int. Cl.
*H04Q 7/00* (2006.01)

(52) U.S. Cl. .................. 370/331; 370/335; 370/332; 370/252; 370/329; 370/342; 455/436; 455/437; 455/453; 455/440

(58) Field of Classification Search ............... 455/436, 455/437, 439, 442, 453, 450, 452.1, 440; 370/252, 331, 332, 335, 329, 342
See application file for complete search history.

(56) References Cited

U.S. PATENT DOCUMENTS

| | | | | |
|---|---|---|---|---|
| 5,490,165 A * | 2/1996 | Blakeney et al. | ............ | 370/335 |
| 5,594,718 A * | 1/1997 | Weaver et al. | ............... | 370/331 |
| 5,680,395 A * | 10/1997 | Weaver et al. | ............... | 370/331 |
| 5,926,470 A * | 7/1999 | Tiedemann, Jr. | ............ | 370/334 |
| 5,940,761 A * | 8/1999 | Tiedemann et al. | ......... | 455/437 |
| 5,987,013 A * | 11/1999 | Kabasawa | ................... | 370/331 |
| 5,999,816 A * | 12/1999 | Tiedemann et al. | ......... | 455/437 |
| 6,026,301 A * | 2/2000 | Satarasinghe | ............... | 455/436 |
| 6,075,990 A * | 6/2000 | Shin | ............................. | 455/440 |
| 6,094,427 A * | 7/2000 | Yi | ............................... | 370/331 |
| 6,201,802 B1 * | 3/2001 | Dean | .......................... | 370/350 |
| 6,243,584 B1 * | 6/2001 | O'Byrne | ...................... | 455/447 |
| 6,307,849 B1 * | 10/2001 | Tiedemann, Jr. | ............ | 370/335 |
| 6,424,351 B1 * | 7/2002 | Bishop et al. | ............... | 345/582 |
| 6,424,834 B1 | 7/2002 | Chang et al. | | |
| 6,430,200 B1 * | 8/2002 | Han et al. | .................... | 370/500 |
| 6,549,524 B1 * | 4/2003 | Shin | ........................... | 370/331 |
| 6,553,064 B1 * | 4/2003 | Chen et al. | ................... | 375/224 |
| 6,590,881 B1 * | 7/2003 | Wallace et al. | .............. | 370/332 |
| 6,621,811 B1 * | 9/2003 | Chang et al. | ................ | 370/342 |
| 6,725,050 B1 * | 4/2004 | Cook | ....................... | 455/456.1 |
| 6,810,254 B2 * | 10/2004 | Tiedemann et al. | ......... | 455/437 |
| 6,826,161 B1 * | 11/2004 | Shahidi et al. | .............. | 370/331 |
| 6,826,402 B1 * | 11/2004 | Tran | ........................... | 455/438 |
| 6,865,173 B1 * | 3/2005 | Czaja et al. | ................. | 370/342 |

(Continued)

*Primary Examiner*—Marceau Milord
(74) *Attorney, Agent, or Firm*—Harness, Dickey & Pierce (57) ABSTRACT

In a method for generating pilot beacons for hard handoff over a border from a first environment to a second environment, the two environments using spread spectrum technology, a RF pilot signal may be received at an operational frequency used in at least the second environment. The RF signal may be downconverted to an IF pilot signal, filtered and then upconverted to a first reproduced RF pilot signal. The first reproduced RF pilot signal may be at a operational frequency used in a first environment, and may represent a pilot beacon for hard handoff between the first and second environments. The method and arrangement may be configured to receive a pilot beacon from one environment and to generate N pilot beacons, in that one environment, for up to N different operational frequencies used in another environment from which a mobile user is transiting, for hard handoff between the environments.

30 Claims, 5 Drawing Sheets

U.S. PATENT DOCUMENTS

| | | | |
|---|---|---|---|
| 6,909,899 B2 * | 6/2005 | Wang et al. | 455/436 |
| 7,009,953 B2 * | 3/2006 | Tiedemann, Jr. | 370/332 |
| 7,016,331 B1 * | 3/2006 | Joo et al. | 370/334 |
| 7,020,109 B2 * | 3/2006 | Grilli et al. | 370/331 |
| 7,130,285 B2 * | 10/2006 | Chang | 370/331 |
| 7,307,969 B2 * | 12/2007 | Shin | 370/331 |
| 7,313,398 B1 * | 12/2007 | Ramahi | 455/436 |
| 7,346,351 B2 * | 3/2008 | Shin | 455/439 |
| 7,437,159 B1 * | 10/2008 | Yarkosky et al. | 455/436 |

* cited by examiner

METHOD AND ARRANGEMENT FOR GENERATING PILOT BEACONS IN WIRELESS COMMUNICATION SYSTEMS

BACKGROUND OF THE INVENTION

1. Field of the Invention

The present invention generally relates to wireless communication systems, and more particularly to methods for generating pilot beacons in such systems.

2. Description of Related Art

A spread spectrum mobile communication system (e.g., CDMA) typically includes mobile stations that are capable of moving around unspecified regions, and base stations for receiving/transmitting messages from/to the mobile stations, as well as managing radio resources. A control station may be provided for controlling the base stations and the reception/transmission of messages from/to the base stations, and a switching center may provide connections to the control station, switching centers of other communication systems, or other communication networks, for communication between mobile stations or between the mobile station and a fixed station. As an important feature of a spread spectrum mobile communication system is assurance of mobility for a subscriber's mobile station, handoff technology is required.

A handoff is a method of switching a communication path between the mobile station and a base station so that communication is continuous when the mobile station goes out of the coverage area of a first base station and into the coverage area of a second base station. A handoff may also be used when the mobile station moves beyond a service region of a sector, or between cells, for example.

There are typically three (3) types of handoffs: a softer handoff, a soft handoff, and a hard handoff. The softer handoff occurs when the mobile station moves between sectors of a single base station. In this type of handoff, a frequency and a frame offset are maintained, and the mobile station sets up a new communication channel with a destination sector, while the present communication channel between the mobile station and the base station is maintained. Thus, a packet, such as a voice or data packet, may be transmitted on many channels. The initial communication channel is subsequently cut off when the mobile station has sufficiently moved into the destination sector such that maintenance of the initial communication channel is no longer required.

The soft handoff may occur when the mobile station moves between adjacent base stations while a frequency and a frame offset are maintained. In this handoff, the mobile station sets up a communication channel with a destination base station while maintaining the initial communication channel with the first base station. A packet, such as a voice or data packet, may be transmitted on many channels. The initial communication channel is subsequently cut off when the mobile station has sufficiently moved into the destination cell such that maintenance of the initial communication channel is no longer required.

A hard handoff may be used when the mobile station moves to an adjacent base station and the frame offset or frequency is changed. Additionally, the hard handoff may be used when the mobile station moves to another switching center. Unlike the softer handoff and the soft handoff, the mobile station cannot maintain the initial communication channel. Rather, a newly set up communication channel is used to transmit the voice/data packet.

With the advancement of technology and the demand of the market, it is foreseeable that more private spread spectrum networks will be installed in addition to existing public spread spectrum networks, such as the Sprint PCS CDMA network by Sprint, Inc. Major corporations or institutes may have the desire to establish private spread spectrum networks on their corporate/institutional sites or grounds (hereafter "sites") to provide higher quality and/or more economical wireless service to their employees or guests. However, such sites are often heavily populated with mobile units such as cellular phones, hand-held PCs, PDAs, etc., for example. To worsen the situation, the size of the site may be relatively small, so that it may reside entirely within one cell of a larger network.

A feature of spread spectrum technology that differentiates it from other wireless communication technologies is its use and reuse of specific frequencies. Although this may provide a technical edge over other communication technologies such as time division multiple access (TDMA), reuse of specific frequencies makes the corporate site scenario described above undesirable, since a comparatively large number of users may have to be serviced by one sector of the cell using the same frequency. This may reduce the quality of the wireless services provided to the mobile units on the site.

As a result, it may be desirable for a private spread spectrum network on a site to use a carrier frequency different from the surrounding networks. Consequently, signal interference between the surrounding network and the private network on the site may be greatly reduced because different carrier frequencies are employed. However, for providing continuous wireless service to a mobile station when it enters or leaves the site, a hard handoff must occur between the private network and outside network(s).

There are several difficulties associated with hard handoff. An active wireless service, such as an ongoing telephone call, should not be interrupted or dropped due to the change of the carrier frequency when carrying out such a hard handoff. In addition, when a mobile user exits the site, he should be able to continue his conversation on the mobile station, even though the mobile station needs to switch from the private network to the surrounding network. Such a transition should be performed in a relatively small border area between the site and outside, and vice versa when the mobile user enters the site.

Unfortunately, various problems exist for performing a handoff at the border area. Soft handoffs would not work well in this situation. In order to take advantage of a soft handoff, only one carrier frequency can be involved. Soft handoffs are thus most useful for switching wireless service between two base stations using the same carrier frequency. For the situation discussed above, since at least two carrier frequencies would be involved, the soft handoff scheme would be difficult to deploy.

For example, in order to use a soft handoff scheme, as it is known in the art, the only alternative is to configure a tier of cells for providing a soft handoff zone between the site and the surrounding network. This would dramatically increase the cost of installing such a private network since additional, expensive infrastructure equipment must be installed. Moreover, significant redesign of the surrounding network is also required to accommodate this change, which may add further costs to the private network.

Therefore, a soft handoff may be economically infeasible. A hard handoff design may therefore be more preferable. But there are problems with using a conventional hard handoff scheme, such as a round trip delay handoff in a small area. As it is known in the art, the round trip delay handoff can detect the motion of a mobile station only when it moves for more than 250 meters. This may not work for the site scenario mentioned above, because the sites themselves may have a radius of less than 500 meters. The handoffs thus cannot be guaranteed to happen at or near the entrance, or the exit, of the site, since the border area between the site and the surrounding network(s) may only be about 25 meters in length, for example.

However, the above problems with hard handoff are being addressed by installing pilot beacon generators at entrances/ exits of a site. For example, assume that an entrance to a site, or private CDMA network, is surrounded by an existing public CDMA network. The private CDMA network has a carrier frequency F1 (i.e., operational frequency), and the surrounding CDMA network has a different carrier frequency F2.

For example, two pilot beacon generators, also known as pilot beacon distributors, may be installed at or near entrances of the site, where at each entrance one inbound pilot beacon distributor directs handoff to the frequency F1 of the private network, and one outbound pilot beacon distributor directs handoff to the frequency F2 of the public network. The pilot beacon distributors may contain beacon antennas for transmitting pilot beacons. Thus, once a mobile station passes through an area covered by an outbound pilot beacon distributor, its wireless service is expected to be switched to the frequency F2 of the surrounding public network. Similarly, if the mobile unit passes through the area covered by the inbound pilot beacon distributor, it is expected to be switched to the frequency F1 of the private network on the site.

In a complex communication network, multiple carrier frequencies may be employed both for the private network and the surrounding networks. Since a pilot beacon is needed for each carrier frequency at each location, this limitation may greatly and rapidly increase the cost of a pilot beacon generation system when networks expand to more carrier frequencies.

However, conventional pilot beacon generation or distribution systems assume that when a plurality of pilot beacons are deployed, all of them carry identical information being transmitted at different frequencies. For example, an original pilot beacon at one frequency F may be split into N copies of the pilot beacon S0, S1 . . . Sn. These copies, except S0, may be further fed into a mixer that creates intermediate signals at slightly different frequencies around the original frequency F. Subsequently, a band pass filter may be used to eliminate unwanted image frequencies to render a resultant pilot beacon at a distinct carrier frequency. Thus, the resultant set of pilot beacons F1 . . . Fn, in conjunction with S0 (which is now F0), have different frequencies that will not interfere with each other.

But, in fact, each of the pilot beacons may not carry identical information being transmitted at different frequencies. For example, conventional pilot beacon generator systems do not actually determine an unknown pilot beacon signal, they simply generate a plurality of guesses (e.g., set of pilot beacons F1 . . . Fn, at different frequencies so as not to interfere with each other). Conventional pilot beacon generator systems may not account for a scenario where two neighboring CDMA systems, or neighboring cells along a border have the same number of operational frequencies, (or carrier frequencies), but which are not be at identical frequencies (e.g., cell A has carrier frequencies at F1 and F2, cell B at F3 and F4); or alternatively, two neighboring systems and/or cells that may have the same operating frequencies, but one of the bordering communications systems or cells may be transmitting an additional operational frequency over an additional channel (e.g., cell A has one channel at F1, cell B has a channel operating at F1 and a channel operating at F2)). Further, the conventional pilot beacon generation systems do not provide a mechanism to inform a base station in the private (or public) network whether or not the pilot beacon generation system is functioning properly, so as to continuously generate pilot beacons.

SUMMARY OF THE INVENTION

In an exemplary embodiment, the present invention is directed to a method and arrangement for generating pilot beacons for hard handoff over a border between first and second environments using spread spectrum technology. In the method, an RF pilot signal may be received at an operational frequency used in the second environment. The RF signal may be downconverted to an IF pilot signal, filtered and then upconverted to a first reproduced RF pilot signal. The first reproduced RF pilot signal may be at a operational frequency used in the first environment, and may represent a pilot beacon for hard handoff between the first and second environments. The method and arrangement may be configured to receive a pilot beacon from one environment to which a mobile user is entering, and to generate N pilot beacons, in that one environment, for up to N different operating frequencies used in another environment from which a mobile user is transiting, for hard handoff between the environments.

BRIEF DESCRIPTION OF THE DRAWINGS

Exemplary embodiments of the present invention will become more fully understood from the detailed description given hereinbelow and the accompanying drawings, wherein like elements are represented by like reference numerals, which are given by way of illustration only and thus are not limitative of the exemplary embodiments of the present invention and wherein.

DETAILED DESCRIPTION

The following description may be described as based on second and/or third generation wireless communications systems, such as a wireless communication system employing CDMA 2000 1xEV-DO technology, or alternatively as based on the recently approved CDMA2000 1xEV-DV which, unlike EV-DO, combines voice and data on a single 1.25 MHz channel in order to provide integrated voice with simultaneous packet data services at speeds of up to 4.8 Mbps, while being backward compatible with CDMA One and CDMA2000 1x. Although exemplary embodiments may be described in this context, it should be noted that the exemplary embodiments shown and described herein are meant to be illustrative only and not limiting in any way. As such, various modifications will be apparent to those skilled in the art for application to other communication systems, e.g., UMTS, for example, and are contemplated by the teachings herein.

Where used below, a mobile station is a device providing data connectivity to a user. A mobile station may be connected to a computing device such as a laptop, personal computer (PC), or it may be a self-contained data device such as a personal digital assistant (PDA) or cellular phone. Accordingly, a mobile station is equivalent to, and may be also be referred to as, an access terminal, wireless mobile, remote station, mobile unit, user, user equipment (UE) or any other remote user of wireless resources in a wireless communication network.

Additionally, a base station (or base transmitter station) refers to network equipment providing data connectivity between a network, such as the Internet or an intranet, for example, and one or more mobile stations. A base station is equivalent to, and may also be referred to as, an access network or Node-B, for example.

Further, where used herein, the terms "first environment" and "second environment" may also be referred to as an indoor network and/or an outdoor (or surrounding) network. An indoor network may be equivalent to a private spread spectrum network or private communication system using spread spectrum technology (e.g., CDMA or UMTS, for example, such as a private spread spectrum network on corporate/institutional sites or grounds. An outdoor network, or surrounding network, may be equivalent to a public spread spectrum network or public communication system using spread spectrum technology, for example. Moreover, first and second environments may also refer to two or more neighboring cells within a spread spectrum network such as a CDMA or UMTS network or communication system.

Figure 1:
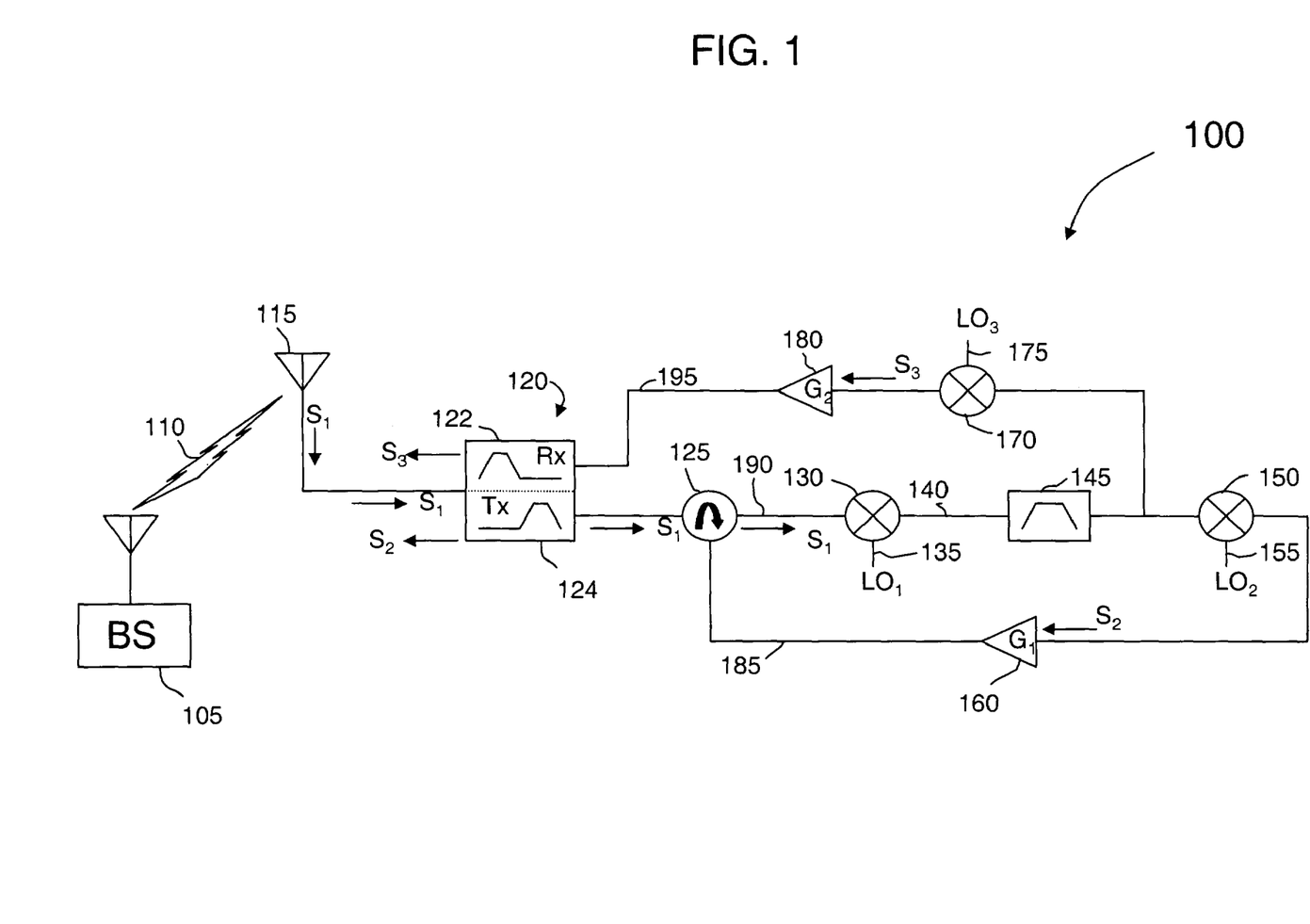
FIG. 1 is a block diagram of an arrangement for generating pilot beacons in accordance with an exemplary embodiment of the present invention.

FIG. 1 is a block diagram of an arrangement for generating pilot beacons in accordance with an exemplary embodiment of the present invention. In FIG. 1, arrangement 100 may be embodied as, and include many of the parts or components of, a mobile station, but may be fixed, with an AC adapter, battery and charger built-in, for example. Arrangement 100 may be positioned in the vicinity of an entrance to a first environment (e.g., indoor network such as a private spread spectrum network), or near a border between two environments using spread spectrum technology, such as CDMA or UMTS, for example. Arrangement 100 may include an antenna 115, first filter 120, a circulator 125, a plurality of mixers 130, 150 and 170 modulated by corresponding local oscillation signals 135, 155 and 175, a second filter 145 and amplifiers 160 and 180, for example.

A method for generating pilot beacons for hard handoff over a border between first and second environments using spread spectrum technology is described referring to FIG. 1. In this exemplary embodiment, a mobile user is transiting from a first environment that operates at an operational frequency F2, to a second environment that operates at an operational frequency F1. Antenna 115 may receive an active channel signal S1, which may be broadcast by a nearby base station 105 over link 110. Antenna 115 may be a directional antenna or omni-directional antenna. Base station 105 may be a base station in the second environment (with S1 representing an RF pilot signal, or pilot beacon that is continuously broadcast from base station 105 on a carrier frequency (e.g., the operational frequency F1) in the second environment, for example.

First filter 120 may be a duplexer filter, for example, and may include a receive portion 122 and a transmit portion 124. Signal S1 is transmitted in the transmit band of base station 105's cellular spectrum, thus when received via antenna 115, signal S1 is filtered through the transmit portion 124 of first filter 120 in order to remove unwanted noise outside of the frequency band of interest.

The filtered S1 signal is fed to circulator 125. Circulator 125 operates as follows. If a signal is input to the left hand side (as is S1), the signal is essentially blocked from lower branch 185, but essentially goes through middle branch 190 with minimal loss to a first mixer 130. Further, a signal received from lower branch 185 may also proceed essentially with minimal loss to transmitter portion 124 of first filter 120, but is blocked from middle branch 190.

First mixer 130 receives signal S1 from circulator 125. First mixer 130 may be configured as a downconverter, modulating ("beating") signal S1 with a first local oscillation signal 135 in order to create an IF signal, shown generally at 140. The IF signal 140 may be fed to a second filter 145. Second filter 145 may be embodied as a narrowband filter for example, in order to output a filtered version of S1 at an intermediate frequency (IF) of about 1.25 MHz, for example. In other words, second filter 145 chops out the one carrier frequency of interest (e.g., operational frequency of the first (or second) environment).

The filtered S1 may then be subject to one or more upconverting evolutions. For example, in middle branch 190, the input to second mixer 150 may be beat with a second local oscillation signal 155 so as to translate (up-mix) the filtered S1 to an operational frequency of the other environment (e.g., F2 of the first environment). Thus, F2 may be derived from F1 in the second environment. Since F2, referred to herein as signal S2, exits second mixer 150 at a low signal level, it may be multiplied by a gain G1 in first amplifier 160 of lower branch 185, and fed back, via circulator 125 and transmit portion 124 of first filter 120, as signal S2. Signal S2 may then be broadcast by antenna 115 as a pilot beacon of the second environment, over a channel assigned to the pilot beacon in the transmit band of a base station in the second environment's cellular spectrum. Thus, as the mobile user (mobile station) enters a border area, e.g., is in the vicinity of an entrance, leaving the first environment for the second environment, the pilot beacon of the first environment (F2, embodied as S2) is known to a base station in the second environment, for a seamless hard handoff of the mobile station from the first to the second environment.

In upper branch 195, the input (filtered S1) to third mixer 170 may be upconverted with another local oscillation signal so as to translate (up-mix) the filtered S1 to the operational frequency of the first environment (e.g., F2 of a first environment), but instead of being transmitted in the transmit band of a base station in the second environment, F2, referred to herein as signal S3, will be transmitted so as to be received in the receive band of the base station 105's cellular spectrum. S3 exits third mixer 170 at a low signal level, may be multiplied by gain G2 in second amplifier 180 of upper branch 195, and fed back through the receive portion 122 of first filter 120, as signal S3. S3 may then be broadcast by antenna 115 as a confirmation signal to the second environment, over a channel in the receive band of the base station 105 in the second environment's cellular spectrum.

In particular, signal S3, which may be transmitted continuously by arrangement 100, informs the base station 105 in the second environment (since arrangement 100 is transmitting at the same pilot beacon frequency, but in the base station's receive band) that arrangement 100 is operating properly and is generating pilot beacons. If this signal were to be interrupted, or should cease altogether, this would be indicative of a failure or problem at arrangement 100 (e.g., no pilot beacons are being generated). In other words, the existence of S3 in the base station's receive band is indicative of a properly functioning pilot beacon generation system.

Further in the above exemplary embodiment, arrangement 100 could include a processor (not shown in FIG. 1). The processor may be embodied as any of a microprocessor/microcontroller chip, digital signal processor (DSP), or plurality of application specific integrated circuits (ASICs) which could be used for programming the oscillation signals 135, 155 and 175 for mixers 130, 150 and 170, and gains G1 and G2 of amplifiers 160 and 180, for example.

It should also be understood that in the exemplary embodiment described above, e.g., a mobile station transiting from a first indoor network at carrier frequency F2 to a second outdoor network at carrier frequency F1, is not limited to egress from the first to second environments, but may be used to handoff from one or more public spread spectrum networks to a private spread spectrum network as well (ingress to the private CDMA or UMTS network, for example).

Additionally, exemplary embodiments of the present invention are not limited to hard handoff between two networks, each having a single, different carrier frequency. The method and arrangement may be configured to replicate, from a single received pilot beacon of a second environment (e.g., environment a mobile user is transiting to) using spread spectrum technology, N re-produced pilot signals that may represent N different operational frequencies of the first environment (e.g., environment the mobile user is currently in), such as an environment having channels operating at different carrier frequencies than the carrier frequency of the pilot beacon received from a second environment, for example. Further, exemplary embodiments of the present invention may be configured for hard handoff between two neighboring cells along a border in a single spread spectrum network or system, for example.

Figure 2:
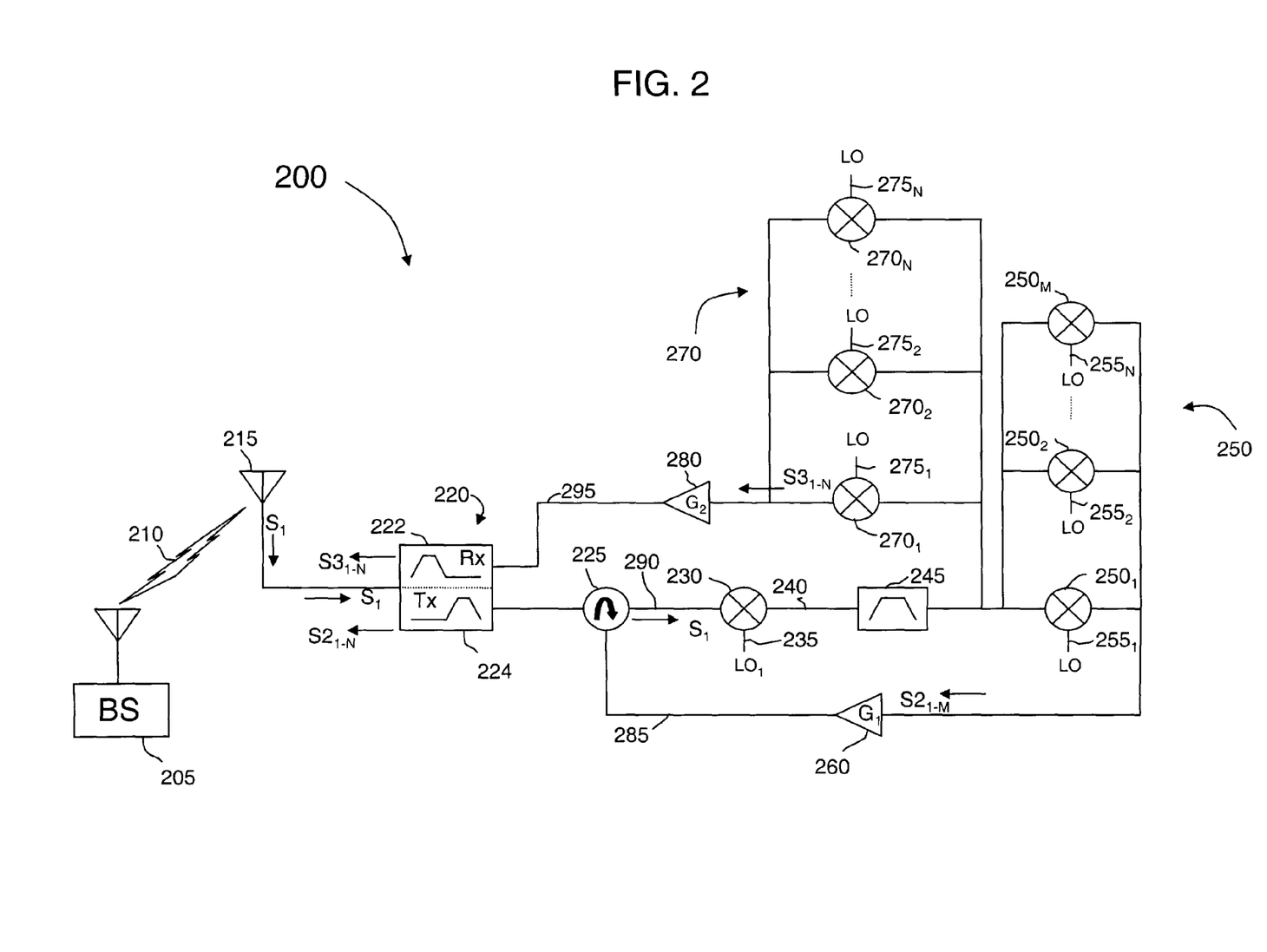
FIG. 2 is a block diagram of an arrangement for generating pilot beacons in accordance with another exemplary embodiment of the present invention.

FIG. 2 is a block diagram of an arrangement for generating pilot beacons in accordance with another exemplary embodiment of the present invention. Many of the components in FIG. 2 are repeated from FIG. 1, thus only differences between the two figures are discussed. In FIG. 2, an RF block diagram of an arrangement 200 includes a first set of mixers 250, including mixers $250_1$ to $250_N$ in middle branch 290, and a second set of mixers 270, including mixers $270_1$ to $270_N$ in upper branch 295.

A method for generating pilot beacons for hard handoff over a border between first and second environments using spread spectrum technology is described referring to FIG. 2. Unlike the previous exemplary embodiment, in this exemplary embodiment a mobile user is transiting from a first environment having a number of operational frequencies $F2_{1-N}$ to a second environment which may have a single operational frequency F1, it being understood that the second environment could have multiple operational frequencies that may be different from $F2_{1-N}$.

As in the previous embodiment, antenna 215 may receive an active channel signal S1 (representing F1) from nearby base station 205 of the second environment over link 210, which may be filtered through transmit portion 224 of first filter 220, and fed with minimal loss through circulator 225 to first mixer 230. First mixer beats signal S1 with a first local oscillation signal 235 in order to create an IF signal, shown generally at 240. The IF signal 240 is fed to second filter 245 in order to output a filtered version of S1 at an intermediate frequency (IF) of about 1.25 MHz, for example.

The filtered S1 may then be subject to one or more upconverting evolutions. For example, in middle branch 290, the input to the first set of mixers 250 may be beat with a plurality of different local oscillation signals $255_1$ to $255_N$ so as to translate the filtered S1 to one or more operational frequencies of the first environment (e.g., $F2_{1-N}$, which are being used or useable in the first environment). Since each frequency $F2_{1-N}$, referred to herein as signals $S2_{1-N}$, may exit each of the corresponding mixers $250_{1-N}$ in the first set of mixers 250 at low signal levels, these signals may be multiplied by gain G1 in first amplifier 260 of lower branch 285, and fed back, via circulator 225 and the transmit portion 224 of first filter 220, signals $S2_{1-N}$.

The signals $S2_{1-N}$ may then be broadcast by antenna 215 as pilot beacons representing N operational frequencies in the first environment, over a channel assigned to the pilot beacon in the transmit band of the base station 205 in the second environment's cellular spectrum. Thus, as a mobile user (mobile station) enters a border area, e.g., is in the vicinity of an entrance, leaving the first environment for the second environment, each pilot beacon of the first environment is known to the base station in the second environment, so as to effect a seamless hard handoff of the mobile station from the first to second environments. It should also be understood that this exemplary embodiment, as in the previous embodiment, is not limited to egress from the first to second environments, but may be used to handoff from a second environment to a first environment, i.e., one or more public spread spectrum networks to a private spread spectrum network, for example.

In upper branch 295, the input (e.g., filtered S1) to each of a second set of mixers 270 (e.g., mixers $270_{1-N}$) may be upconverted with a corresponding local oscillation signal $275_{1-N}$, at each mixer $270_{1-N}$, so as to translate (up-mix) the filtered S1 to one or more of N operational frequencies of the first environment. But, instead of being transmitted in the transmit band of base station 205 in the second environment, the carrier frequencies $F2_{1-N}$, referred to herein as signals $S3_{1-N}$, may be transmitted so as to be received in the receive band of the base station 205's cellular spectrum. Each signal $S3_{1-N}$ exits a corresponding $270_{1-N}$ at a low signal level, thus each signal may be multiplied by gain G2 in second amplifier 280 of upper branch 295, and fed back through the receive portion 222 of first filter 220, as signals $S3_{1-N}$. Each of signals $S3_{1-N}$ may then be broadcast by antenna 215 as a confirmation signal to the second environment, over a channel in the receive band of the base station 205 in the second environment's cellular spectrum.

As in the previous embodiment, of signals $S3_{1-N}$ informs the base station in the second environment that arrangement 200 is operating properly and is generating pilot beacons. If this signal were to be interrupted, or should cease altogether, this would be indicative of a failure or problem at arrangement 200 (e.g., no pilot beacons are being generated). In other words, the existence of all of the signals $S3_{1-N}$ in the base station's receive band is indicative of a properly functioning pilot beacon generation system. In other words, if any one of the signals $S3_{1-N}$ have disappeared, this is indicative of at least a partial failure of the pilot beacon generator.

Accordingly, the exemplary embodiments of the present invention are directed to a method and arrangement for generating N pilot beacons for hard handoff over a border between two environments using spread spectrum technology. Exemplary embodiments in accordance with the method and arrangement may be applicable to a scenario where a first environment has a number of operational frequencies (carrier frequencies) equal to a number of operational frequencies in a second environment, but which are at different frequencies. Additionally, exemplary embodiments in accordance with the method and arrangement may be applicable to a scenario where the first environment and second environment each operate at some of the same operational frequencies, but one of the first and second environments has one or more channels of N additional operating frequencies than the other environment.

Figure 3:
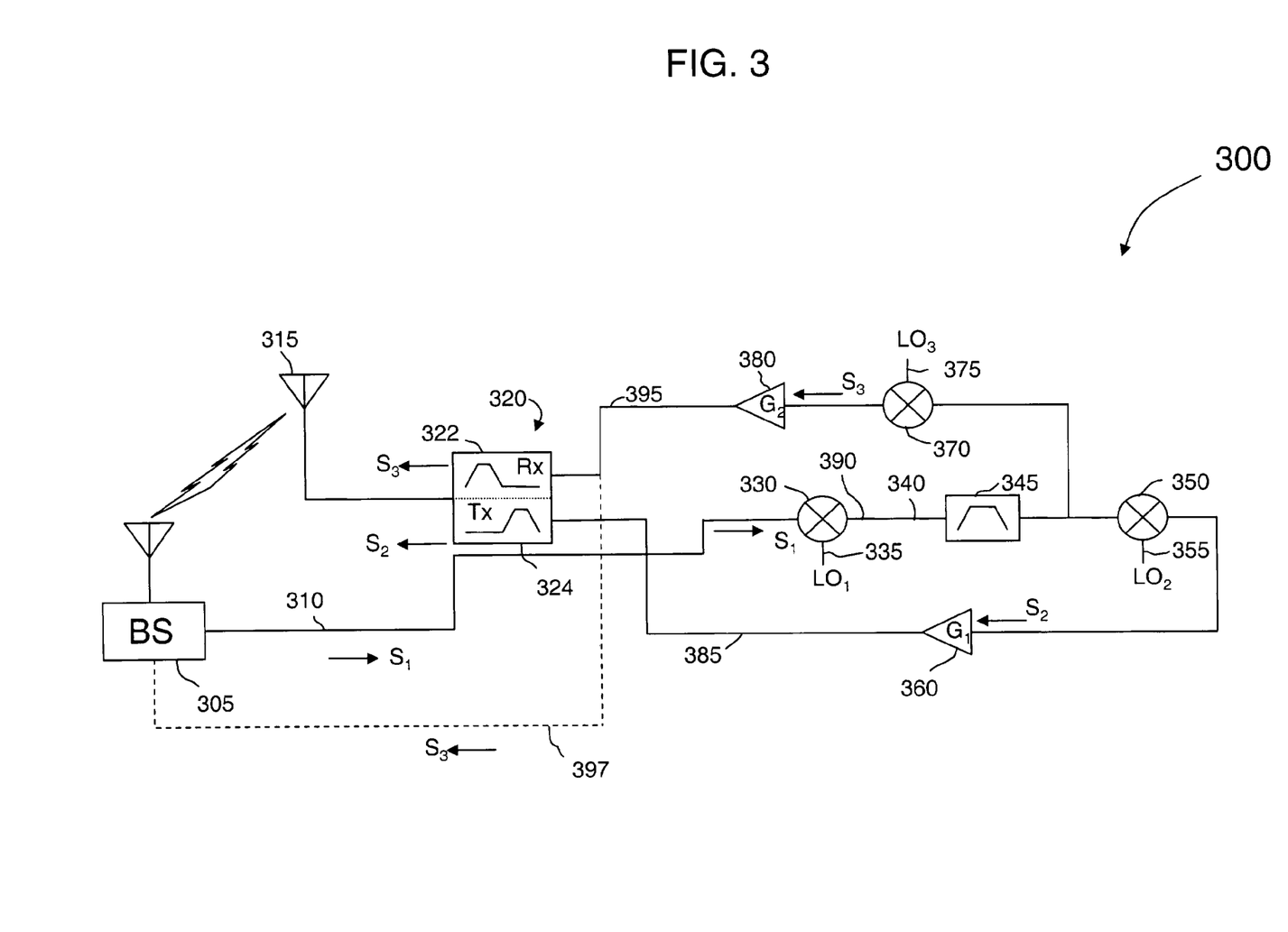
FIG. 3 is a block diagram of an arrangement for generating pilot beacons in accordance with another exemplary embodiment of the present invention.
Figure 4:
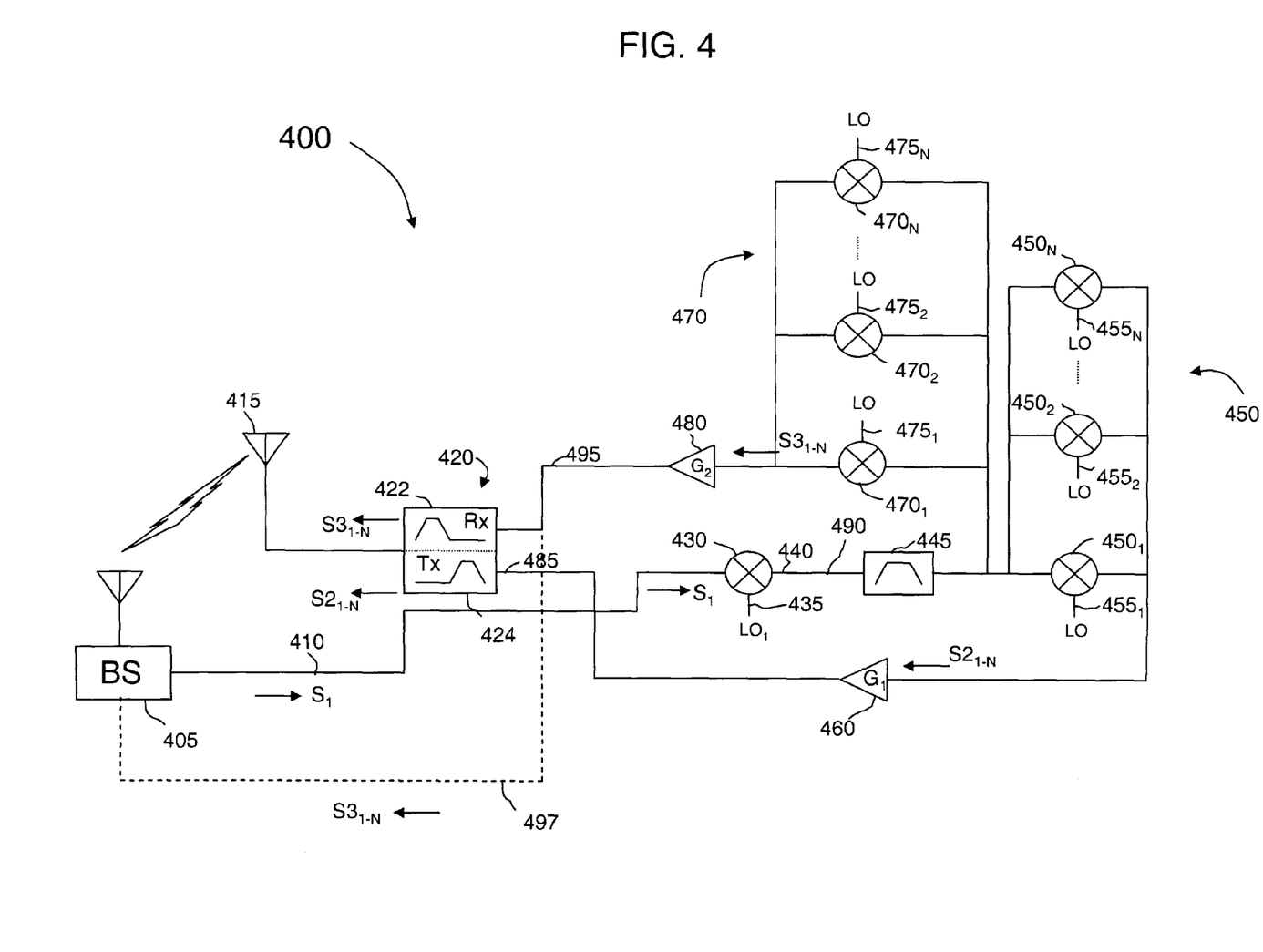
FIG. 4 is a block diagram of an arrangement for generating pilot beacons in accordance with a further exemplary embodiment of the present invention.

FIGS. 3 and 4 are diagrams of arrangements for generating pilot beacons in accordance with other exemplary embodiments of the present invention. FIG. 3 is similar to the exemplary embodiment of FIG. 1; and FIG. 4 is similar to the exemplary embodiment of FIG. 2.

To this point, the exemplary embodiments have been described in a wireless context. However, the method and arrangement may be applicable to a system or scenario where pilot beacons are received over a cabled medium. For example, and referring to FIG. 3, instead of an antenna 315 receiving an active channel signal S1, which in FIGS. 1 and 2 is shown as being broadcast by a nearby base station, in this embodiment a near-by base station 305 may send signal S1 over a cabled medium 310 directly to first mixer 330. Accordingly, signal S1 may not have to be initially filtered at first filter 320 filtered, and a circulator is not necessary in arrangement 300, prior to downconversion to IF.

Similar to FIGS. 1 and 2, S1 is subject to subsequent filtering, upconverting to signals S2 and S3, multiplying and transmitting processes, via one of receive portion 322 (signal S3) and transmit portion 324 (signal S2) of the first filter 320, and antenna 315 to a base station 305 in a second environment. The cabling medium 410 in FIG. 4 is identical to FIG. 3, thus a detailed explanation is omitted. As in FIG. 3, initial filtering may not be required, at first mixer 430 and no circulator is necessary in arrangement 400 of FIG. 4. Optionally, in FIGS. 3 and 4, the confirmation signals S3 and $S3_{1-N}$ may be fed back directly to the base station 305, 405 over cabling mediums 397 and 497, instead of over a link. This is shown in FIGS. 3 and 4 as a dotted line from amplifiers 380/480 to base station 305/405. In each of FIGS. 3 and 4, the cabling mediums 310, 397, 410 and 497 may be embodied as any of a RF cable or a fiber-optic cable, for example.

Figure 5:
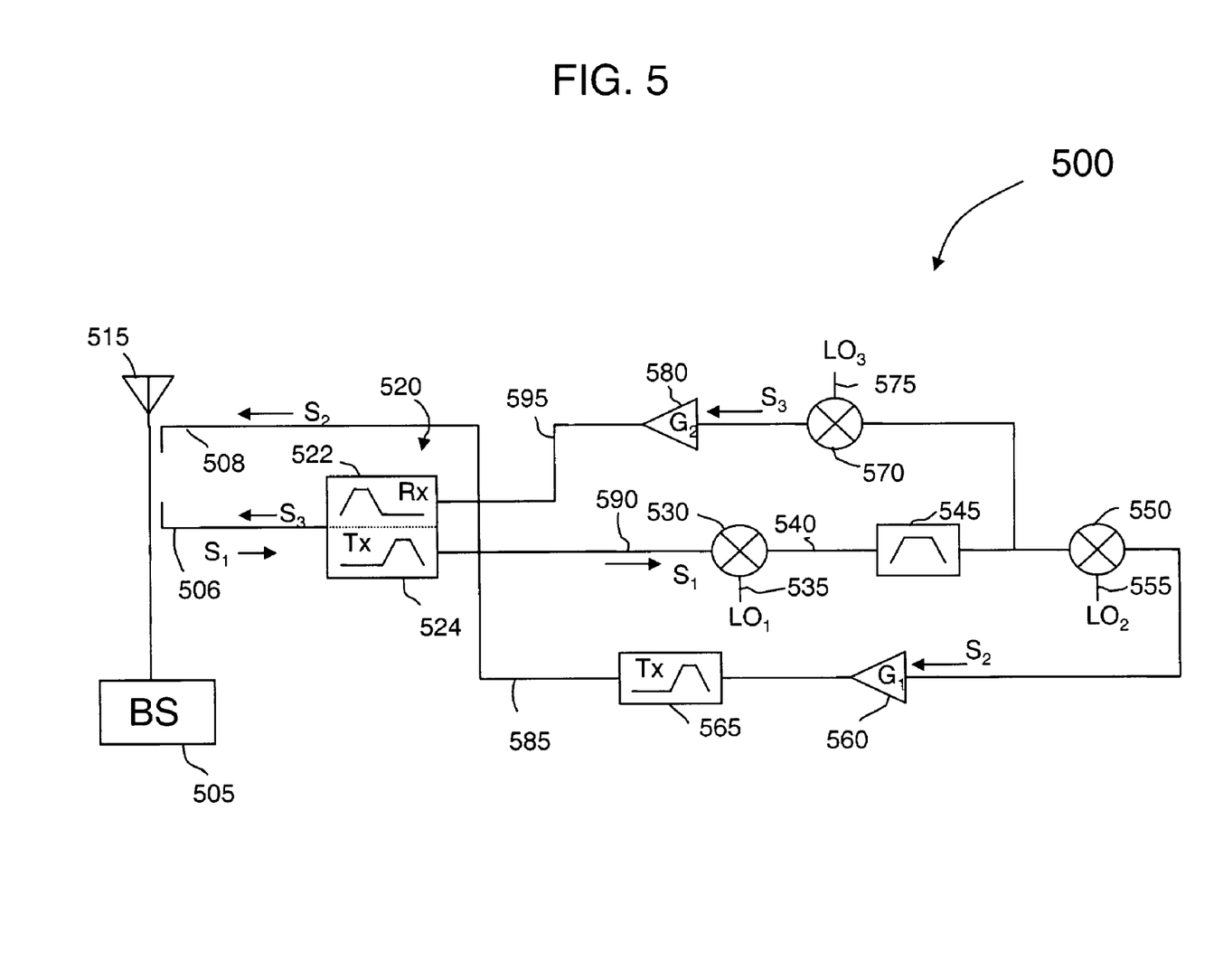
FIG. 5 is a block diagram of an arrangement for generating pilot beacons in accordance with a further exemplary embodiment of the present invention.

FIG. 5 is a block diagram of an arrangement for generating pilot beacons in accordance with a further exemplary embodiment of the present invention. Many elements of FIG. 5 are substantially identical to that described in FIGS. 1-4, as is some of the operation thereof. Accordingly, only the differences with regard to the arrangement and operation of the exemplary embodiment of FIG. 5 are described in detail for convenience.

FIG. 5 employs directional couplers, an incident coupler 506 and a reflected coupler 508. Accordingly, arrangement 500 may be configured as an in-line attachment between transceiver circuitry in a base station 505, and the base station's antenna 515, with the couplers 506 and 508 providing integration between arrangement 500 and the base station 505, for example.

Additionally in FIG. 5, arrangement 500 requires no circulator, since the couplers 506 and 508 permit a signal to pass in only one direction, as will be discussed below. Further, lower branch 585 includes a third filter 565 for signal S2. Thus, S2 is not routed through first filter 520 prior to being transmitted, as in the previous embodiments, as a pilot signal for a mobile user in the first environment that may be transiting into the second environment, for example.

In operation, an operational frequency in the second environment (F1) appears at the output of base station 505. Incident coupler 506 picks off an active channel signal S1 (representing F1) in the second environment from the output. Similar to the previous exemplary embodiments, signal S1 is filtered through a transmit portion 524 of first filter 520 in order to remove unwanted noise outside of the frequency band of interest, downconverted to IF (540), upconverted to signal S2 (representing F2 an operational frequency in the first environment) at mixer 550 in middle branch 590, and upconverted to signal S3 (confirmation signal) at mixer 570 in upper branch 595, with signal S2 multiplied by gain G1 in first amplifier 560 of lower branch 585, and signal S3 multiplied by gain G2 in second amplifier 580 of upper branch 595.

However, signal S2 at the output of first amplifier 560 is to be transmitted by coupling the signal back onto the same antenna 515 of the base station 505 in the second environment. Accordingly, signal S2 is filtered at third filter 565 and coupled back onto antenna 515 by reflected coupler 508, which prevents signal S2 from being received by transceiver circuitry at base station 505. Antenna 515 then transmits S2 so that a mobile user at F2 in the first environment may be handed off (e.g., by hard handoff) to F1 in the second environment.

Signal S3 is filtered via receive portion 522 of first filter 520 as in the previous embodiments, but is coupled directly to the base station 505 via incident coupler 506, which prevents signal S3 from being transmitted via antenna 515. As in the previous exemplary embodiments, signal S3 informs the base station in the second environment that arrangement 500 is operating properly and is generating pilot beacons. If this signal were to be interrupted, or should cease altogether, this would be indicative of a failure or problem at arrangement 500 (e.g., no pilot beacons are being generated). In other words, the existence of all of the signals S3 in the base station's receive band is indicative of a properly functioning pilot beacon generation system.

It should be understood that the exemplary embodiment of FIG. 5 may be applied to a spread spectrum system having N operating frequencies, as described above with respect to FIGS. 2 and 4. Signals $S2_{1-N}$ may be broadcast via reflected coupler 508 and antenna 515 as pilot beacons representing N operational frequencies in the first environment, over a channel assigned to the pilot beacon in the transmit band of the base station 505 in the second environment's cellular spectrum. Thus, as a mobile user (mobile station) enters a border area, e.g., is in the vicinity of an entrance, leaving the first environment for the second environment, each pilot beacon of the first environment is known to the base station in the second environment, so as to effect a seamless hard handoff of the mobile station from the first to second environments.

It should also be understood that this exemplary embodiment, as in the previous exemplary embodiments, is not limited to egress from the first to second environments, as hard handoff from the first to second environments is also foreseen, i.e., hard handoff from one or more public spread spectrum networks to a private spread spectrum network, for example.

Further, the exemplary embodiment of FIG. 5, as in the other exemplary embodiments of the present invention, may be configured for hard handoff between two neighboring cells along a border in a single spread spectrum network or system, for example.

EXAMPLES

The following descriptive examples illustrate applications of the exemplary embodiments of the present invention and as such, should not be construed as limiting the exemplary embodiments. In each of the Examples, a mobile user in one environment is handed off to another environment, each environment using spread spectrum technologies. The term frequency as used below refers to operational frequencies of the environment.

Example 1

Single operational frequencies in each environment, but different. In this example, a mobile station in a first environment at an operational frequency F1 is to be handed off to a second environment at an operational frequency F2, where F1 and F2 are different. In accordance with the exemplary embodiments of the present invention, a pilot beacon at F1 is created, in the second environment, and is derived from F2. Accordingly, as the mobile user enters the second environment, the pilot beacon at F1 is detected and hard hand-off may occur. It is understood that in the reverse transmit from the second environment to the first a pilot beacon at F2 is created, in the first environment, and is derived from F1.

Example 2

Multiple, different operational frequencies. In this example, a mobile station in a first environment at operational frequencies F1, F2 and F3 is to be handed off to a second environment at operational frequencies F4, F5 and F6, where F1-F6 are all different from each other. In accordance with the exemplary embodiments of the present invention, pilot beacons at F1, F2 and F3 are derived from one or more of F4-F6 in the second environment. Accordingly, as the mobile user enters the second environment, the pilot beacons at F1-F3 are detected and hard hand-off may occur. Conversely, when the mobile user is traveling from the second environment to the first environment, pilot beacons at F4-F6 are derived from one or more of F1-F3 in the second environment.

Example 3

Multiple operational frequencies in one environment, one additional different frequency. In this example, a mobile station in a first environment at operational frequency F1 is to be handed off to a second environment at operational frequencies F1 and F2, where F1 is the same in both environment and F2 is different. In accordance with the exemplary embodiments of the present invention, a pilot beacon at F1 is derived from F2 in the second environment. Accordingly, as the mobile user, operating at F2, enters the second environment, the pilot beacon at F1 is detected and hard hand-off may occur. However, since F2 is present in both environments, no additional pilot beacons are required when a mobile user transits from the second to first environments.

Example 4

Multiple operational frequencies, one environment has additional different frequencies. In this example, a mobile station in a first environment at operational frequencies F1-F6 is to be handed off to a second environment at operational frequencies F1-F3, where F1-F3 are the same in both environments, but with the first environment having additional operational frequencies F4-F6. In accordance with the exemplary embodiments of the present invention, pilot beacons at F4-F6 are derived from one or more of F1-F3 in the second environment. Accordingly, as the mobile user, operating on one of F4-F6, enters the second environment, the pilot beacons at F4-F6 are detected and hard hand-off may occur. However, since F1-F3 is present in both environments, no additional pilot beacons are required when a mobile user transits from the second to first environments.

Example 5

Multiple operational frequencies, multiple frequencies different. In this example, a mobile station in a first environment at operational frequencies F1 and F2 is to be handed off to a second environment at operational frequencies F2 and F3, where only F2 is the same in both environments. In accordance with the exemplary embodiments of the present invention, a pilot beacon at F1 may be derived from one or more of F2 and F3 in the second environment. Accordingly, as the mobile user, operating at F1, enters the second environment, the pilot beacon at F1 is detected and hard hand-off may occur. However, when a mobile user, operating at F3, transits from the second environment to the first, a pilot beacon at F3 may be derived from one or more of F1 and F2 in the first environment, so that F3 is detected and hard handoff may occur.

Exemplary embodiments of the present invention being thus described, it will be obvious that the same may be varied in many ways. Such variations are not to be regarded as departure from the spirit and scope of the exemplary embodiments of the invention, and all such modifications as would be obvious to one skilled in the art are intended to be included within the scope of the following claims.

What is claimed is:

1. A method for generating pilot beacons for hard handoff over a border from a first environment to a second environment using spread spectrum technology, comprising:
   receiving an RF pilot signal on an operational frequency used in the second environment;
   downconverting the RF pilot signal to an IF pilot signal;
   filtering the IF pilot signal;
   first upconverting the entire filtered IF signal to a first reproduced RF pilot signal that is at an operational frequency used in the first environment, and which represents a pilot beacon for hard handoff from the first environment to the second environment;
   second upconverting the entire filtered IP signal to a second reproduced RF pilot signal that is at the operational frequency used in the first environment; and
   transmitting the first reproduced RF pilot signal and the second reproduced RF pilot signal to a base station,
   wherein the first environment has an operational frequency that is different from one or more operational frequencies in the second environment.

2. The method of claim 1, wherein the first environment is one of an indoor environment and an outdoor environment.

3. The method of claim 1, wherein the second environment is one of an indoor environment and an outdoor environment.

4. The method of claim 2, wherein the indoor environment is a private spread spectrum communication system employing one of CDMA and UMTS technology, and the outdoor environment is a public spread spectrum communication system employing one of CDMA and UMTS technology.

5. The method of claim 3, wherein the indoor environment is a private spread spectrum communication system employing one of CDMA and UMTS technology, and the outdoor environment is a public spread spectrum communication system employing one of CDMA and UMTS technology.

6. The method of claim 1, wherein the first environment and second environment are two neighboring cells in a spread spectrum communication system employing one of CDMA and UMTS technology.

7. The method of claim 1, wherein the different operational frequency is one or more additional operational frequencies belonging to one of the first and second environments, and at least one of the operational frequencies in the first environment and second environment are the same operational frequencies.

8. The method of claim 1, wherein the first reproduced RF pilot signal is transmitted over a channel in a transmit band of a cellular spectrum of the base station.

9. The method of claim 1, wherein the second reproduced RF pilot signal is transmitted over a channel in a receive band of a cellular spectrum of the base station, the second reproduced RF signal being a confirmation signal indicating whether or not a beacon signal is present.

10. The method of claim 1, wherein said receiving further comprises receiving the RF pilot signal over one of an air link and a cabled medium.

11. The method of claim 1, further comprising:
transmitting the pilot beacon to a mobile user in the first environment.

12. The method of claim 11, wherein said receiving and transmitting are performed over the same antenna.

13. A method for generating N pilot beacons for hard handoff over a border from a first environment to a second environment using spread spectrum technology, comprising:
receiving a RF pilot signal at an operational frequency used in the second environment;
downconverting the RF pilot signal to an IF pilot signal;
filtering the IF pilot signal; and
performing a first set of N upconverting operations on the entire filtered IF signal to form a first set of N reproduced RF pilot signals, wherein each Nth reproduced RF pilot signal of the first set is at a particular operational frequency used in the first environment and represents a pilot beacon for hard handoff from the first environment to the second environment; and
performing a second set of N upconverting operations on the entire filtered IF signal to form a second set of N reproduced RF pilot signals, wherein each N reproduced RF pilot signal of the second set is at a particular operational frequency used in the first environment; and
transmitting the first set of N reproduced RF pilot signals and the second set of N reproduced RF pilot signals to a base station,
wherein the first environment has an operational frequency that is different from one or more operational frequencies in the second environment.

14. The method of claim 13, further comprising:
wherein the first set of N reproduced RF pilot signals is transmitted over a corresponding channel assigned to each Nth pilot beacon in a transmit band of a cellular spectrum of the base station.

15. The method of claim 14, wherein said receiving and transmitting are performed over the same antenna.

16. The method of claim 13, wherein the second set of N reproduced RF pilot signals is transmitted over a corresponding channel assigned to each Nth pilot beacon in a receive band of a cellular spectrum of the base station, the second set of N reproduced RF pilot signals being confirmation signals indicating whether or not a beacon signal is present in the second environment.

17. The method of claim 13, wherein the first and second environments employ one of CDMA and UMTS technology.

18. The method of claim 13, wherein the first environment and second environment are two neighboring cells in a spread spectrum communication system employing one of CDMA and UMTS technology.

19. The method of claim 13, wherein said receiving further comprises receiving the RF pilot signal over one of an air link and a cabled medium.

20. An arrangement for generating pilot beacons for hard handoff over a border between first and second environments using spread spectrum technology, comprising:
receiving means for receiving an RF pilot signal on an operational frequency used in the second environment;
downconverting means for downconverting the RF pilot signal to an IF pilot signal;
filtering means for filtering the IF pilot signal; and
first mixing means for upconverting the entire filtered IF signal to a first reproduced RF pilot signal that is at an operational frequency used in the first environment, and which represents a pilot beacon for hard handoff from the first environment to the second environment,
second mixing means for upconverting the entire filtered IF signal to a second reproduced RF pilot signal that is at the operational frequency used in the first environment; and
transmitting means for transmitting the first reproduced RF pilot signal and the second reproduced RF pilot signal to a base station,
wherein the first environment has an operational frequency that is different from one or more operational frequencies in the second environment.

21. The arrangement of claim 20,
wherein the transmitting means transmits the first reproduced RF pilot signal over a channel in a transmit band of a cellular spectrum of the base station.

22. The arrangement of claim 21, wherein said receiving means and transmitting means employ the same antenna.

23. The arrangement of claim 20, wherein the transmitting means transmits the second reproduced RF pilot signal over a channel in a receive band of a cellular spectrum of the base station, the second reproduced RF pilot signal being a confirmation signal indicating whether or not a beacon signal is present.

24. The arrangement of claim 20, wherein said first and second mixing means is further adapted to upconvert the entire filtered IF signal to first and second N reproduced RF pilot signals that are at N operational frequencies used in the first environment.

25. The arrangement of claim 24, wherein
the transmitting means transmits the first N reproduced RF pilot signals corresponding channels assigned to each Nth pilot beacon in a transmit band of a cellular spectrum of the base station.

26. The arrangement of claim 25, wherein said receiving means and transmitting means employ the same antenna.

27. The arrangement of claim 24, wherein the transmitting means transmits the second N reproduced RF pilot signals over a corresponding channel in a receive band of a cellular spectrum of the base station, the second N reproduced RF pilot signals being confirmation signals indicating whether or not a beacon signal is present.

28. The arrangement of claim 27, wherein the first and second environments employ one of CDMA and UMTS technology.

29. The arrangement of claim 27, wherein the first environment and second environment are two neighboring cells in a spread spectrum communication system employing one of CDMA and UMTS technology.

30. The arrangement of claim 27, wherein said receiving means receives the RF pilot signal over one of an air link and a cabled medium.

* * * * *